United States Patent [19]

Berlyn

[11] 3,738,639

[45] June 12, 1973

[54] MASKS FOR USE IN THE MANUFACTURE OF CIRCUIT BOARDS

[75] Inventor: Ronald Cory Berlyn, Edgbaston, England

[73] Assignee: Joseph Lucas (Industries) Limited, Birmingham, England

[22] Filed: Apr. 23, 1971

[21] Appl. No.: 136,835

[30] Foreign Application Priority Data

June 9, 1970 Great Britain ................... 27,808/70

[52] U.S. Cl. ................ 269/317, 269/303, 29/203 B

[51] Int. Cl. ............................................. B23q 3/18

[58] Field of Search .................. 269/157, 162, 196, 269/254 R, 254 CS, 303, 305, 315, 317, 319; 29/203 B, 203 J, 203 P

[56] References Cited

UNITED STATES PATENTS 3,565,418 2/1971 Arnold .............................. 269/317

*Primary Examiner*—Robert L. Spruill
*Attorney*—Holman & Stern

[57] ABSTRACT

A mask for use in the manufacture of a circuit board has a base with a plurality of apertures therein arranged to receive components and or connectors which are to be connected to each other and/or to a substrate associated with the mask. The base carries resilient means which urges the substrate against a fixed stop on the base to hold the substrate in position relative to the base.

2 Claims, 2 Drawing Figures

INVENTOR
Ronald Cory Berlyn
ATTORNEYS

MASKS FOR USE IN THE MANUFACTURE OF CIRCUIT BOARDS

This invention relates to masks for use in the manufacture of circuit boards.

A mask, according to the invention, includes a base having a plurality of apertures therein arranged to receive components and/or connectors which are to be connected to each other and/or to a substrate associated with the mask in use, and resilient means carried by the base for urging said substrate against a fixed stop on the base to hold said substrate in position relative to the base.

Preferably, said resilient means is adjustable between a first position wherein said resilient means urges said substrate against said fixed stop and a further position wherein said resilient means is disengaged from the substrate.

Conveniently said resilient means comprises a flat spiral of spring strip secured at one end thereof to the base and abutting adjacent the free end thereof against said mask in use, at least the portion of said strip abutting against said substrate in use being flat and having a depth slightly less than the thickness of the substrate, and a cam member journalled for rotation on the base and acting on said spring strip to provide means for adjusting the strip between said first and second positions. Conveniently, the entire strip is of rectangular cross-section.

Figure 1:
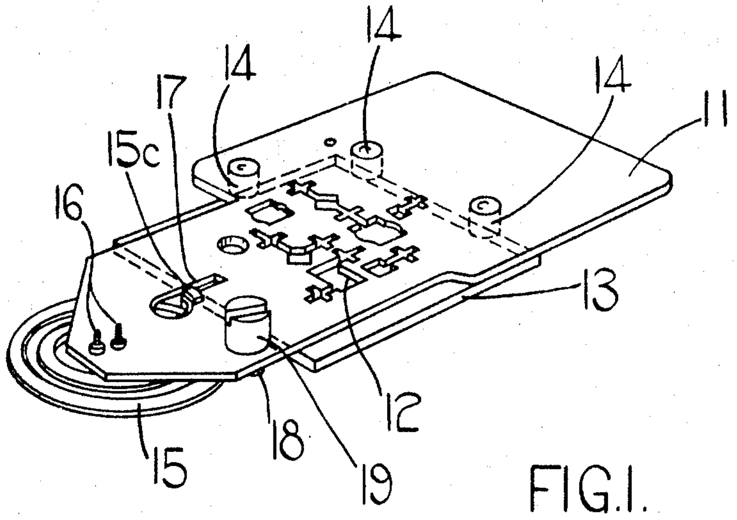
Figure 2:
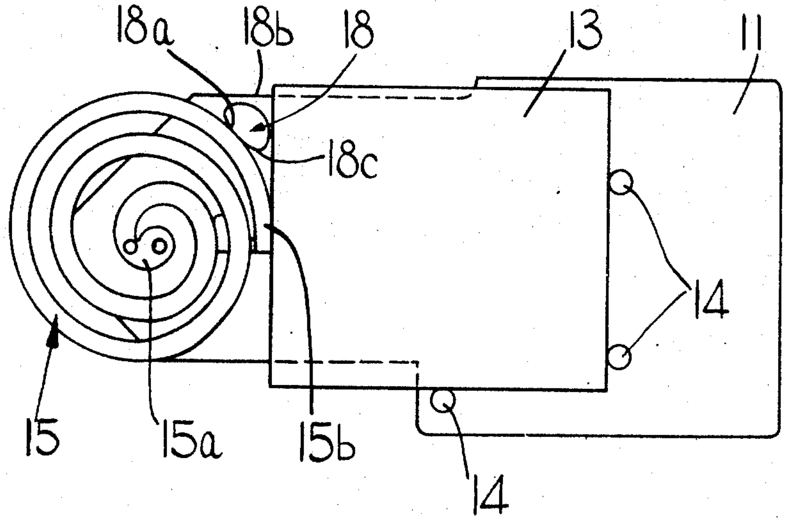

In the accompanying drawings,

FIG. 1 is a side elevational view showing a mask according to one example of the invention with a substrate held in position below the mask, FIG. 2 is an inverted plan view of FIG. 1, Referring to the drawings, the mask includes a base 11 having a plurality of apertures 12 therein arranged so as to allow the formation of the required circuit board on a substrate 13 positioned below the base 11. The base 11 is formed on its lower face with three angularly spaced integral projections 14 which define a fixed stop so that in use resilient means carried by the base 11 and described in detail below, urges the substrate 13 against the fixed stop to hold the substrate in position below the apertures 12 in the mask.

The resilient means carried by the base 11 comprises a flat spiral of spring strip 15, the strip 15 being secured at one end 15*a* thereof to the lower surface of the base 11 and being formed at its free end 15*b* with a portion 15*c* which projects upwardly through a slot 17 in the base and extends along the upper surface of the base. A cam member 18 is mounted on the lower surface of the base 11 and is journalled for rotational movement relative to the base. The cam member 18 includes a substantially flat surface 18*a* and a substantially semicircular surface 18*b*, the surfaces 18*a*, 18*b* extending upwardly from the base. The cam member 18 abuts against the strip 15 adjacent the free end 15*b* thereof and a screw member 19 integral with the cam member 18 and mounted on the upper surface of the base 11 for movement with the cam member 18 provides means for rotating the cam member in use.

The spring strip 15 is secured to the end of the base remote from the projections 14 so that the apertures 12 in the base are defined between the strip 15 and the projections 14, the arrangement of the strip being such that the substrate 13 can be held in position below the base 11 with the end of the strip 15*b* resiliently urging the substrate against the projections 14. The spiral strip 15 is of rectangular cross-section and the depth of the strip is slightly less than the thickness of the substrate 13 so as to ensure that the resilient action of the strip is directed parallel to the base. Further the portion 15*c* of the strip 15 can move against the resilience of the strip along slot 17 in the base 11, the slot 17 being arranged so that the portion 15*c* is constrained to move at right angles to the end of the substrate in contact with the strip so that there is no tendency for the substrate 13 to be urged out of engagement with the projection 14. The provision of the portion 15*c* of the strip also helps to anchor the substrate in position and prevent accidental disengagement of the substrate from the mask.

The cam member 18 provides means in use for adjusting the resilient means constituted by the spiral strip 15 between a first position wherein the substrate 13 is resiliently urged against the fixed stop and a second position wherein the strip is disengaged from the substrate. Rotation of the cam member 18 either urges the free end 15*b* of the strip 15 against the inherent resilience of the strip or allows the strip to move under its own resilience towards an unflexed condition, the portion 15*c* of the strip moving along the slot 17 during movement of the free end 15*b* of the strip.

In order to mount a substrate 12 in position below the mask the strip is adjusted to be in its second position wherein an axially extending edge 18*c* of the cam member 18 defined between the surfaces 18*a*, 18*b* urges the free end of the strip away from the fixed stop. In this second position the substrate can be slid into position below the base 11 and into engagement with the projections 14 defining the fixed stop, the free end of the strip being spaced from substrate at this stage. It is to be appreciated that in this second position since the resilient action of the strip 15 is acting on the edge 18*c* of cam member there is no tendency for the cam member to be rotated by the strip and thus the second position is stable.

When the substrate is in position relative to the mask the screw member 19 is rotated in a direction to move the edge 18c out of engagement with the strip 15 and the surface 18*a* into contact with the strip. The end 15*b* of the strip is therefore allowed to move under its own resilience towards a position in which the substrate is resiliently urged against the fixed stop, which is the situation shown in FIG. 2. When it is required to release the substrate from the mask the screw member 19 is turned so that the cam member 18 is rotated in a clockwise direction from the position shown in FIG. 2 until the edge 18*c* of the cam member engages the strip 15 to hold the wire in its second position at which state the substrate 13 can be removed from the mask. The member 19 may have extending therefrom an arm cooperating with fixed pegs to restrict movement of the member 19.

It is to be appreciated that although in the example shown in the drawings the whole of the spiral strip 15 is of rectangular cross-section and has depth slightly less than the thickness of the substrate it is only necessary that the portion of the strip abutting against the mask in use should be flat and have a depth slightly less than the thickness of the substrate. Further it is to be appreciated that the thickness of the strip 15 must not be too small with respect to the thickness of the substrate otherwise there will be a tendency for the strip to urge the substrate out of engagement with the posts 14. However, the strip 15 also must not have a thickness greater than or equal to the thickness of the substrate since in this case it is found that the substrate will no longer lie flat against the heater block during soldering operations.

I claim:

1. A mask for use in the manufacture of a circuit, board including a base having a plurality of apertures therein for receiving circuit elements which are to define, together with a substrate associated with the mask in use, the required circuit board, a fixed stop on the base, a substantially flat spiral of spring strip secured at one end thereof to the base, a portion of said strip adjacent the free end thereof, in use abutting against the substrate associated with the mask and urging the substrate against the fixed stop, said portion of the strip being substantially flat and having a depth slightly less than the thickness of the substrate to be associated with the mask in use, and a cam member journalled for rotation on the base and acting on said portion of the spring strip to provide means for moving said portion between a first position, wherein, in use, said portion urges the substrate against the fixed stop, and a second position, wherein, in use, said portion is disengaged on the substrate.

2. A mask as claimed in claim 1, in which the entire strip is of rectangular cross-section.

* * * * *